United States Patent [19]
Dovek et al.

[11] Patent Number: 5,650,887
[45] Date of Patent: Jul. 22, 1997

[54] SYSTEM FOR RESETTING SENSOR MAGNETIZATION IN A SPIN VALVE MAGNETORESISTIVE SENSOR

[75] Inventors: Moris Musa Dovek, San Carlos; Bruce Alvin Gurney, Santa Clara; Virgil Simon Speriosu, San Jose, all of Calif.

[73] Assignee: International Business Machines Corporation, Armonk, N.Y.

[21] Appl. No.: 606,625

[22] Filed: Feb. 26, 1996

[51] Int. Cl.$^6$ .............................. G11B 5/455; G11B 5/39
[52] U.S. Cl. .............................. 360/75; 360/113; 324/252; 338/32 R
[58] Field of Search .............................. 360/77.08, 113, 360/75; 324/252, 207.21; 338/32 R

[56] References Cited

U.S. PATENT DOCUMENTS

| | | |
|---|---|---|
| 5,159,513 | 10/1992 | Dieny et al. . |
| 5,206,590 | 4/1993 | Dieny et al. . |
| 5,398,146 | 3/1995 | Draaisma .............................. 360/128 |
| 5,440,233 | 8/1995 | Hodgson et al. .............................. 324/252 |
| 5,465,185 | 11/1995 | Heim et al. .............................. 360/113 |
| 5,583,725 | 12/1996 | Coffey et al. .............................. 360/113 |
| 5,585,986 | 12/1996 | Parkin .............................. 360/113 |
| 5,589,768 | 12/1996 | Ishiyama et al. .............................. 324/207.21 |

OTHER PUBLICATIONS

D. E. Heim et al., "Design and Operation of Spin Valve Sensors", IEEE Transactions on Magnetics, vol. 30, No. 2, Mar. 1994, pp. 316–321.

*Primary Examiner*—Aristotelis M. Psitos
*Assistant Examiner*—James L. Habermehl
*Attorney, Agent, or Firm*—Thomas R. Berthold

[57] ABSTRACT

Sensors based on the giant magnetoresistance effect, specifically "spin valve" (SV) magnetoresistive sensors, have applications as external magnetic field sensors and as read heads in magnetic recording systems, such as rigid disk drives. These sensors have a ferromagnetic layer whose magnetization orientation is fixed or pinned by being exchange coupled to an antiferromagnetic layer. The magnetization of the pinned layer will become misaligned and the sensor will experience an abnormal response to the field being sensed, i.e., the external magnetic field or the recorded data in the magnetic media, if an adverse event elevates the antiferromagnetic layer above its blocking temperature. A pinned layer mangetization reset system is incorporated into systems that use SV sensors. The reset system generates an electrical current waveform that is directed through the SV sensor with an initial current value sufficient to heat the antiferromagnetic layer above its blocking temperature, and a subsequent lower current value to generate a magnetic field around the pinned layer sufficient to properly orient the magnetization of the pinned layer while the antiferromagnetic layer is cooling below its blocking temperature. This process resets the magnetization of the pinned layer to its preferred orientation and returns the SV sensor response substantially back to its desired state.

18 Claims, 9 Drawing Sheets

SYSTEM FOR RESETTING SENSOR MAGNETIZATION IN A SPIN VALVE MAGNETORESISTIVE SENSOR

TECHNICAL FIELD

This invention relates in general to "spin valve" (SV) magnetoresistive (MR) sensors that may be subjected to adverse temperature effects during operation, and more particularly to magnetic recording disk drives that use such sensors as read heads.

BACKGROUND OF THE INVENTION

An MR sensor detects magnetic field signals through the resistance changes of a magnetoresistive element, fabricated of a magnetic material, as a function of the strength and direction of magnetic flux being sensed by the element. The conventional MR sensor operates on the basis of the anisotropic magnetoresistive (AMR) effect in which a component of the element resistance varies as the square of the cosine of the angle between the magnetization in the element and the direction of sense or bias current flow through the element.

MR sensors have application in magnetic recording systems because recorded data can be read from a magnetic medium when the external magnetic field from the recorded magnetic medium (the signal field) causes a change in the direction of magnetization in an MR read head. This in turn causes a change in electrical resistance in the MR read head and a corresponding change in the sensed current or voltage.

A different and more pronounced magnetoresistance, called giant magnetoresistance (GMR), has been observed in a variety of magnetic multilayered structures, the essential feature being at least two ferromagnetic metal layers separated by a nonferromagnetic metal layer. This GMR effect has been found in a variety of systems, such as Fe/Cr or Co/Cu multilayers exhibiting strong antiferromagnetic coupling of the ferromagnetic layers, as well as in essentially uncoupled layered structures in which the magnetization orientation in one of the two ferromagnetic layers is fixed or pinned. The physical origin is the same in all types of GMR structures: the application of an external magnetic field causes a variation in the relative orientation of the magnetizations of neighboring ferromagnetic layers. This in turn causes a change in the spin-dependent scattering of conduction electrons and thus the electrical resistance of the structure. The resistance of the structure thus changes as the relative alignment of the magnetizations of the ferromagnetic layers changes.

A particularly useful application of GMR is a sandwich structure comprising two essentially uncoupled ferromagnetic layers separated by a nonmagnetic metallic spacer layer in which the magnetization of one of the ferromagnetic layers is "pinned". The pinning may be achieved by depositing the ferromagnetic layer to be pinned onto an antiferromagnetic layer, such as an iron-manganese (Fe-Mn) layer, to create an interfacial exchange coupling between the two layers. The spin structure of the antiferromagnetic layer can be aligned along a desired direction (in the plane of the layer) by heating beyond the "blocking" temperature of the antiferromagnetic layer and cooling in the presence of a magnetic field. The blocking temperature is the temperature at which exchange anisotropy vanishes because the local anisotropy of the antiferromagnetic layer, which decreases with temperature, has become too small to anchor the antiferromagnetic spins to the crystallographic lattice. The unpinned or "free" ferromagnetic layer may also have the magnetization of its extensions (those portions of the free layer on either side of the central active sensing region) also fixed, but in a direction perpendicular to the magnetization of the pinned layer so that only the magnetization of the free-layer central active region is free to rotate in the presence of an external field. The magnetization in the free-layer extensions may be fixed by longitudinal hard biasing or exchange coupling to an antiferromagnetic layer. However, if exchange coupling is used the antiferromagnetic material is different from the antiferromagnetic material used to pin the pinned layer, and is typically nickel-manganese (Ni-Mn). This resulting structure is called a "spin valve" (SV) MR sensor. In a SV sensor only the free ferromagnetic layer is free to rotate in the presence of an external magnetic field. U.S. Pat. No. 5,159,513, assigned to IBM, discloses a SV sensor in which at least one of the ferromagnetic layers is of cobalt or a cobalt alloy, and in which the magnetizations of the two ferromagnetic layers are maintained substantially perpendicular to each other at zero externally applied magnetic field by exchange coupling of the pinned ferromagnetic layer to an antiferromagnetic layer. U.S. Pat. No. 5,206,590, also assigned to IBM, discloses a basic SV sensor wherein the free layer is a continuous film having a central active region and end regions. The end regions of the free layer are exchange biased by exchange coupling to one type of antiferromagnetic material, and the pinned layer is pinned by exchange coupling to a different type of antiferromagnetic material.

SV sensors are a replacement for conventional MR sensors based on the AMR effect. They have special potential for use as external magnetic field sensors, such as in anti-lock braking systems, and as read heads in magnetic recording systems, such as in rigid disk drives. However, the SV sensor, which is typically fabricated by depositing an antiferromagnetic layer of Fe-Mn onto the ferromagnetic pinned layer of cobalt (Co) or permalloy (Ni-Fe), suffers from the problem that the range of blocking temperature for this interface is relatively low, i.e., it extends only from approximately 130 deg. C. to approximately 160 deg. C. These temperatures can be reached by certain thermal effects during operation of the disk drive, such as an increase in the ambient temperature inside the drive, heating of the SV sensor due to the bias current, and rapid heating of the SV sensor due to the head carrier contacting asperities on the disk. In addition, during assembly of the disk drive the SV sensor can be heated by current resulting from an electrostatic discharge. If any of these thermal effects cause the SV sensor to exceed the antiferromagnet's blocking temperature the magnetization of the pinned layer will no longer be pinned in the desired direction. This will lead to a change in the SV sensor's response to an externally applied magnetic field, and thus to errors in data read back from the disk.

What is needed is a recovery system and process to reset the magnetization of the SV sensor's pinned layer to the desired orientation with minimal changes in the SV sensor's magnetoresistive response.

SUMMARY OF THE INVENTION

The invention is a system for re-setting or re-pinning the magnetization orientation of an SV sensor's pinned layer if an adverse event elevates the SV sensor's antiferromagnetic layer above its blocking temperature. The invention has application to field sensors and to magnetic recording systems, with special application to magnetic recording rigid disk drives.

In the case of a rigid disk drive, if the magnetization of the SV read head's pinned layer becomes partially or totally unpinned, so that its magnetization direction becomes misaligned from its preferred direction, the SV read head will experience an abnormal response to magnetically recorded user data and/or servo head positioning data on the disk. This will be reflected in the data readback channel as user data errors and/or servo errors. The user data error detection/correction circuitry in the disk drive provides error signals to a digital processor, such as a microprocessor. The digital processor runs an algorithm that checks for the type and frequency of errors to determine that the errors are caused by the misalignment of the magnetization of the SV read head's pinned layer. The digital processor provides an output signal to turn on an electrical current waveform generator. The electrical current waveform is directed through the SV read head with an initial current value sufficient to heat the antiferromagnetic layer above its blocking temperature, and a subsequent lower current value sufficient to generate a correctly oriented magnetic field around the pinned layer while the antiferromagntic layer is cooling below its blocking temperature. This process resets the magnetization of the SV read head's pinned layer to its preferred orientation and returns the SV read head response substantially back to its desired state. Depending on the specific type of SV read head, the current waveform can be applied by the same current source that applies the normal sense or bias current to the SV read head.

For a fuller understanding of the nature and advantages of the present invention, reference should be made to the following detailed description taken together with the accompanying figures.

DETAILED DESCRIPTION OF THE INVENTION

Magnetic Recording Systems

The invention will be described and illustrated in terms of its application to magnetic recording rigid disk drives. However, the invention is also applicable to and can be implemented into other types of magnetic recording systems, such as tape drives, tape cassettes and flexible diskette drives. These types of data storage systems may also use SV read heads that sense magnetically recorded data from movable magnetic media.

Figure 1:
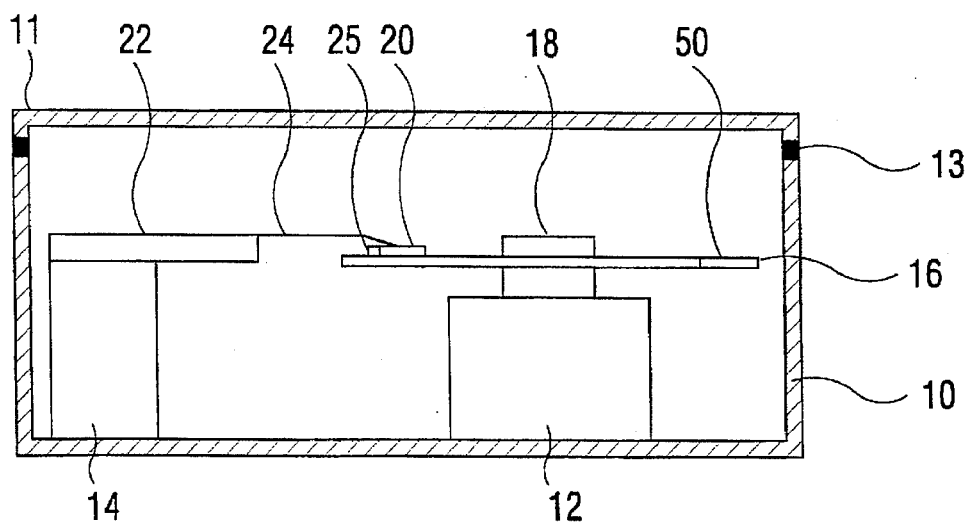
FIG. 1 is a simplified block diagram of a magnetic recording disk drive for use with the SV sensor and recovery system according to the present invention.

The magnetic recording disk drive operable with an SV sensor as the read head and the SV sensor reset mechanism of the present invention is shown in FIG. 1. The disk drive comprises a base 10 to which are secured a disk drive motor 12 and an actuator 14, and a cover 11. The base 10 and cover 11 provide a substantially sealed housing for the disk drive. Typically, there is a gasket 13 located between base 10 and cover 11 and a small breather port (not shown) for equalizing pressure between the interior of the disk drive and the outside environment. A magnetic recording disk 16 is connected to drive motor 12 by means of hub 18 to which it is attached for rotation by the drive motor 12. A thin lubricant film 50 is maintained on the surface of disk 16. A read/write head or transducer 25 is formed on the trailing end of a carrier, such as an air-bearing slider 20. Transducer 25 is typically an inductive write element with a SV sensor read element (not shown in FIG. 1, but shown as item 30 in FIG. 3). The slider 20 is connected to the actuator 14 by means of a rigid arm 22 and a suspension 24. The suspension 24 provides a biasing force that urges the slider 20 onto the surface of the recording disk 16. During operation of the disk drive, the drive motor 12 rotates the disk 16 at a constant speed, and the actuator 14, which is typically a linear or rotary voice coil motor (VCM), moves the slider 20 generally radially across the surface of the disk 16 so that the read/write head may access different data tracks on disk 16. As is well known in the art the read element reads not only data but also servo positioning information pre-recorded on the disk, typically in servo sectors angularly spaced around the disk and located in the data tracks. The servo information is read and processed by a digital control system to control the amount of current sent to the VCM. In this manner the head is maintained on track during read and write operations and accurately moved across the tracks to read and write on all the tracks.

Figure 2:
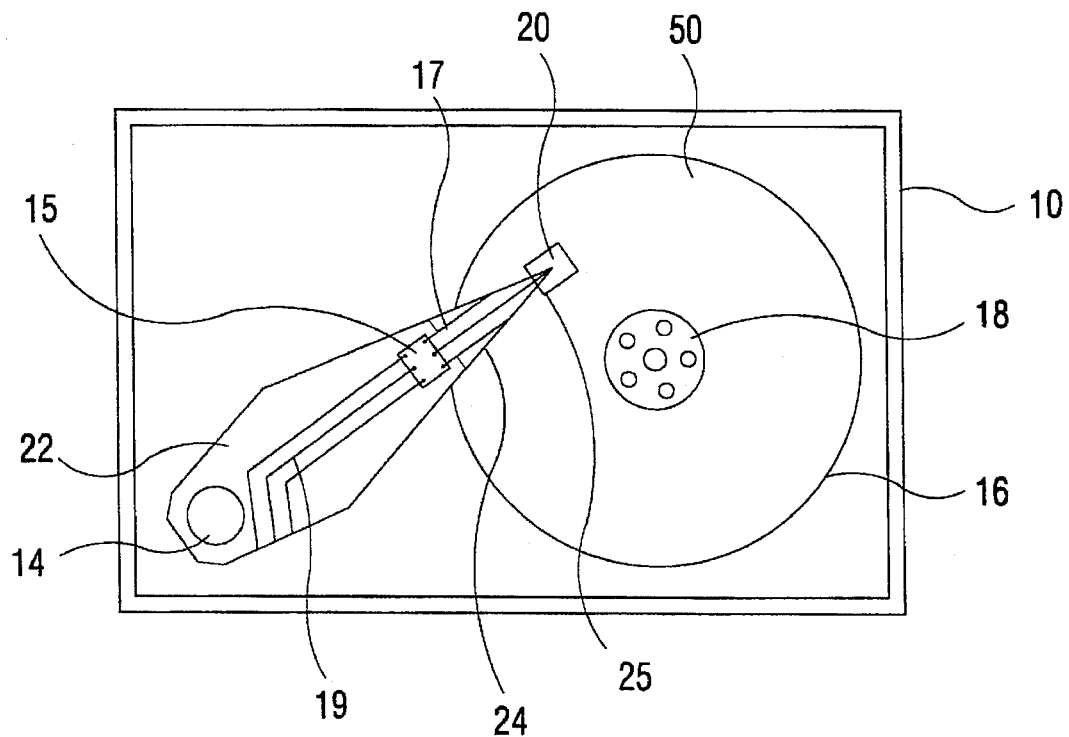
FIG. 2 is a top view of the disk drive of FIG. 1 with the cover removed.

FIG. 2 is a top view of the interior of the disk drive with the cover 11 removed, and illustrates in better detail the suspension 24 that provides a force to the slider 20 to urge it toward the disk 16. The suspension may be a conventional type of suspension such as the well-known Watrous suspension, as described in IBM's U.S. Pat. No. 4,167,765.

This type of suspension also provides a gimbaled attachment of the slider which allows the slider to pitch and roll as it rides on the air bearing. The data detected from disk 16 by the transducer 25 is processed into a data readback signal by signal amplification and processing circuitry in the integrated circuit arm electronics (AE) module 15 located on arm 22. The signals from transducer 25 travel via flex cable 17 to module 15, which sends its output signals via cable 19.

The above description of the magnetic recording disk drive incorporating the present invention, and the accompanying FIGS. 1 and 2, are for representation purposes only. Disk drives may contain a large number of disks and actuators, and each actuator may support a number of sliders.

Figure 3:
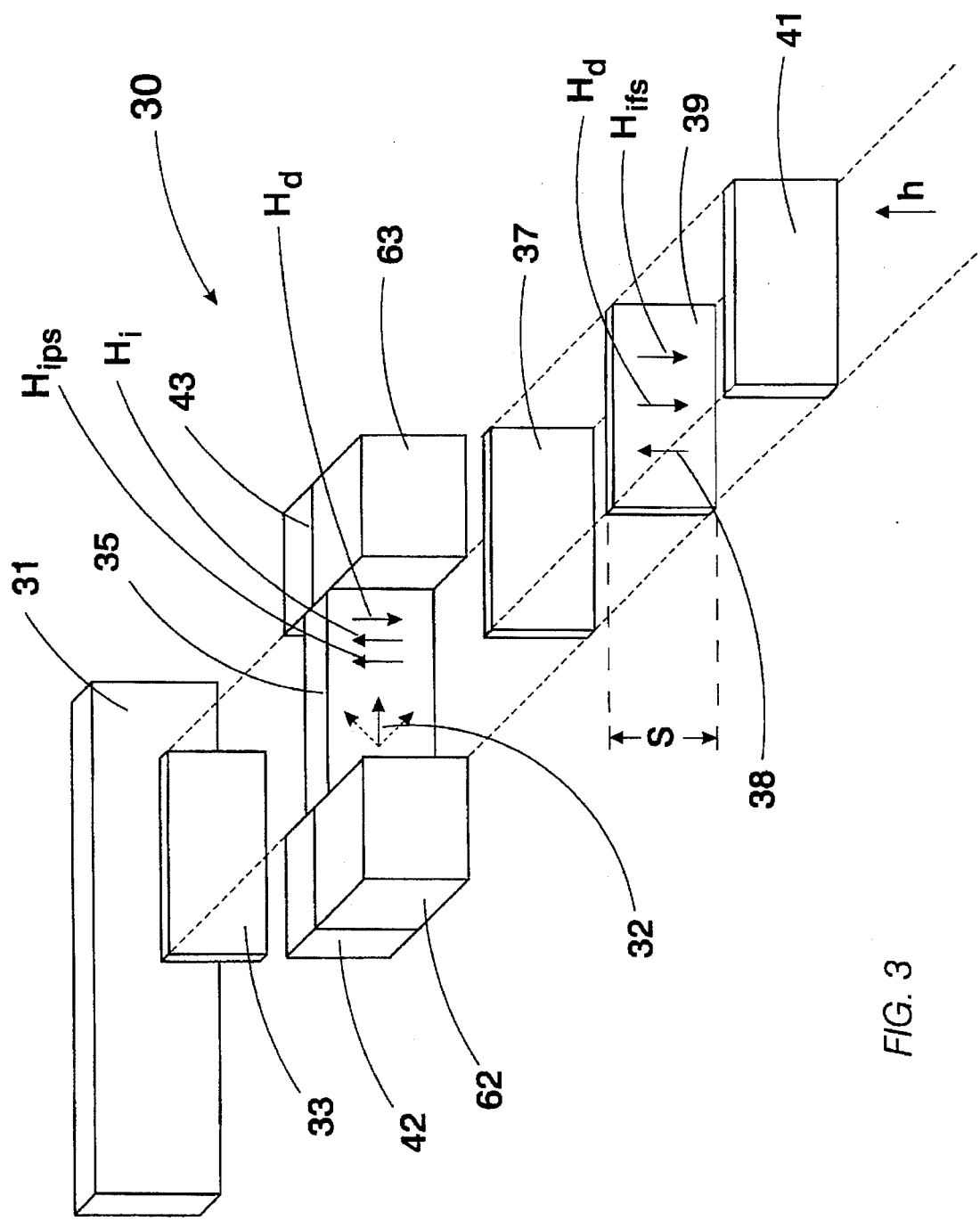
FIG. 3 is an exploded perspective view showing the layers making up a SV sensor.

The SV sensor 30 that forms a part of read/write transducer 25 is shown in FIG. 3. The films forming the completed sensor are supported on a suitable substrate 31. The SV sensor 30 forms part of transducer 25 in the disk drive system of FIGS. 1 and 2, and the substrate 31 may be the trailing end of the head carrier or slider 20.

An underlayer or buffer layer 33 is deposited on substrate 31, followed by a first thin layer 35 of soft ferromagnetic material that serves as the "free" layer. A thin nonferromagnetic metallic spacer layer 37, a second thin layer 39 of ferromagnetic material that serves as the "pinned" layer, and a thin layer 41 of an exchange biasing material having relatively high electrical resistance and being in direct contact with the ferromagnetic layer 39, are successively deposited over free ferromagnetic layer 35. Other types of SV sensors described in the prior art, such as those in which the pinned layer is deposited on the substrate before the free layer, may have layers different from or arranged differently from layers 33–41. Layers 33, 35, 37, 39, 41 are then etched away at their end regions to have a predetermined width generally corresponding to the width of the data track on the magnetic medium, such as disk 16. An additional ferromagnetic layer is then formed directly on the substrate 31 to form ferromagnetic end regions 42, 43 that abut the ends of the active sensing "free" ferromagnetic layer 35. Antiferromagnetic material is then deposited as layers 62, 63 over the end regions 42, 43, respectively, to provide exchange coupling with end regions 42, 43 to longitudinally bias the magnetizations of the end regions 42, 43. As previously mentioned, the longitudinal biasing of the magnetization of the free layer can also be accomplished by hard biasing. For example, layers 42, 43 and 62, 63 can be replaced with a chromium (Cr) underlayer and a cobalt-platinum-chromiun (CoPtCr) magnetic layer, respectively. Not shown in FIG. 3 are the capping layer for corrosion protection and the electrical leads that are patterned on layers 62, 63.

In the absence of an externally applied magnetic field from the recorded magnetic disk 16, the magnetizations of the two layers 35, 39 of ferromagnetic material are oriented at an angle, preferably of about 90 degrees, with respect to each other, as indicated by arrows 32 and 38, respectively. The ferromagnetic layer 35 is called the "free" ferromagnetic layer because its magnetization is free to rotate its direction in response to an externally applied magnetic field (such as magnetic field h from the magnetically recorded disk 16, as shown in FIG. 3). This rotation of the free layer is shown by the dashed arrows on layer 35. The ferromagnetic layer 39 is called the "pinned" ferromagnetic layer because its magnetization direction is fixed or pinned in a preferred orientation, as shown by arrow 38. Layer 41 provides a biasing field by exchange coupling and thus pins the magnetization of the ferromagnetic layer 39 in a preferred direction (arrow 38) so that it cannot rotate its direction in the presence of an applied external magnetic field having a strength in the range of the signal field h from disk 16. Similarly, the layers 62, 63 provide longitudinal biasing by exchange coupling to the end regions 42, 43 that abut the free ferromagnetic layer 35. This assures that the magnetization of the free ferromagnetic layer 35 is maintained generally perpendicular to the magnetization of pinned ferromagnetic layer 39 in the absence of an externally applied magnetic field.

Figure 4:
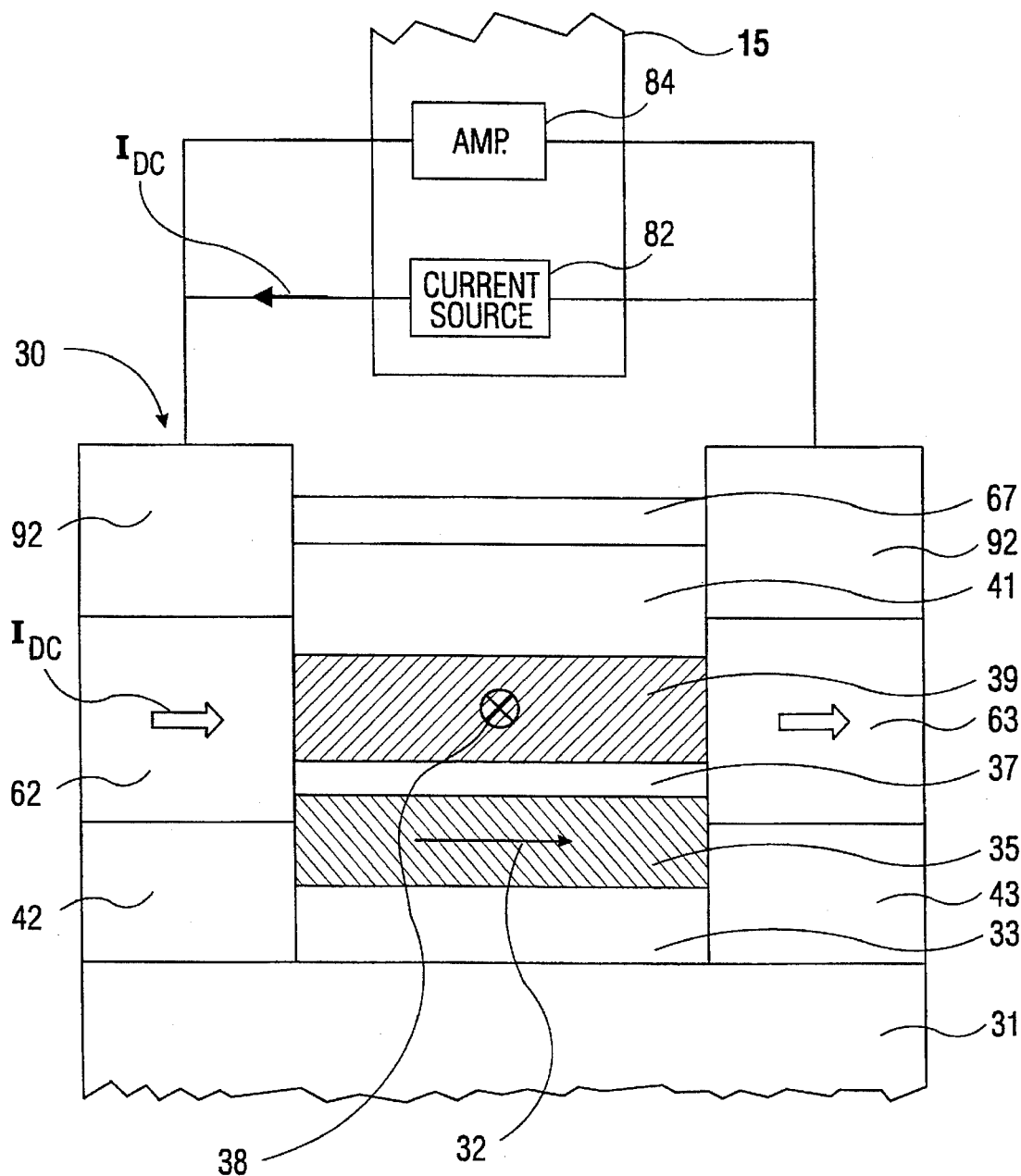
FIG. 4 is a view of the SV sensor of FIG. 3 as seen from the disk and also showing the capping layer and electrical leads.

FIG. 4 is a view of the structure of FIG. 3 as it would appear looking up from the surface of disk 16 and shows the SV sensor 30 with its free layer 35 and pinned layer 39 abutted against ferromagnetic layers 42, 43 of Ni-Fe and antiferromagnetic layers 62, 63 of Ni-Mn. Lead metallurgy 92 for making electrical contact to the sensor is deposited on layers 62, 63, and a capping layer 67 of tantalum (Ta) is formed over antiferromagnetic layer 41.

The SV sensor 30 is electrically connected to AE module 15. In addition to driving the inductive write coil portion of the read/write transducer 25, the AE module 15 provides the SV sensor 30 with a sense or bias current $I_{DC}$ from current source 82.

Referring again to FIG. 3, the magnetization direction 32 of free layer 35 is perpendicular to the magnetization direction 38 of pinned layer 39 with zero applied external field h. This is because of equal and opposite contributions of the pinned layer average magnetostatic field $H_d$ and the sum of the coupling field $H_i$ and the field $H_{ips}$. The field $H_{ips}$ is the field induced in the free layer by the current outside the free layer, i.e., approximately the current flowing through the pinned and spacer layers. This amount of current is a factor (f1) of approximately ½ to ⅔ of the total bias current $I_{DC}$. This relationship can be expressed as follows:

$$H_d = H_i + H_{ips} \tag{1}$$

where $H_{ips}$ is related to the bias current through the sensor $I_{DC}$ (FIG. 4). There is an optimum bias current $I_{DC}$ and bias current direction that satisfies the following equation:

$$H_{ips} = f1 * (2\pi) * I_{DC}/S \tag{2}$$

where s is the stripe height (shown in FIG. 3) of the sensor. A typical stripe height is in the range of 0.7–1.5 microns.

Figure 5:
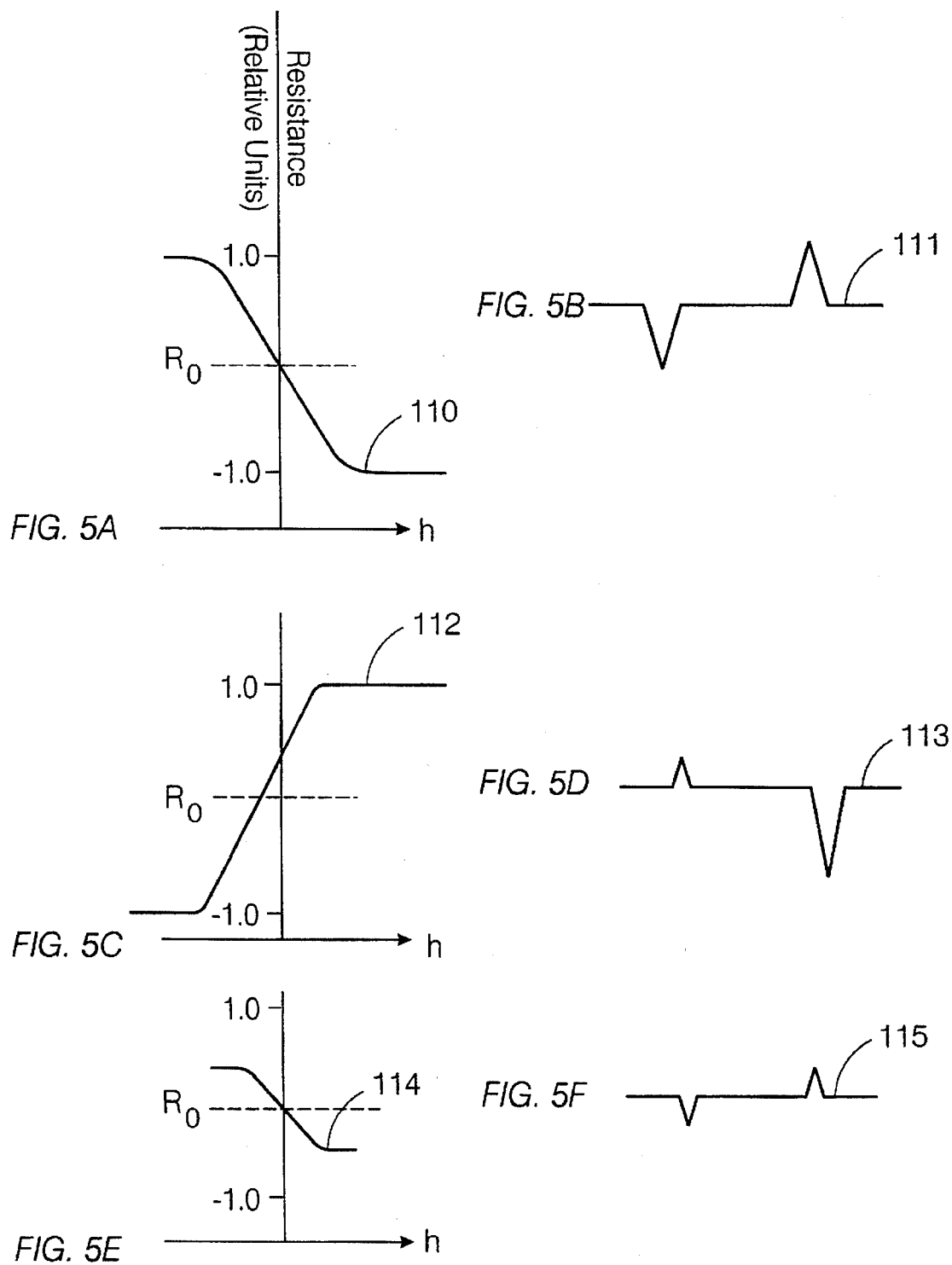
FIG. 5A is a graph of the normal response of SV sensor resistance as a function of applied magnetic field.
FIG. 5B is the readback signal waveform associated with the normal SV sensor response of FIG. 5A.
FIG. 5C is a graph of one type of response of SV sensor resistance as a function of applied magnetic field for a sensor that has had its pinned layer magnetization orientation altered.
FIG. 5D is the readback signal waveform associated with the SV response of FIG. 5C that shows a polarity reversal from the waveform of FIG. 5B.
FIG. 5E is a graph of another type of response of SV sensor resistance as a function of applied magnetic field for a sensor that has had its pinned layer magnetization orientation altered.
FIG. 5F is the readback signal waveform associated with the SV response of FIG. 5E that shows no polarity reversal from the waveform of FIG. 5B.

Shown in FIG. 5A is the normal magnetoresistance transfer curve 110 for the SV sensor. FIG. 5B is normal resultant readback waveform 111 from the SV sensor due to two consecutive magnetic transitions on the disk. An external positive applied field, as shown by h in FIG. 3, aligns the magnetizations of the free layer 35 and pinned layer 39, resulting in a low resistance state (the right side of curve 110), while an external negative applied field results in the higher resistance state (the left side of curve 110).

The pinned layer magnetization 38 is held perpendicular to the magnetization 32 of the free layer 35 at zero applied field. The ferromagnetic exchange provided by the antiferromagnetic Fe-Mn layer 41 holds the pinned layer 39 against its own demagnetizing field $H_d$ and the effective field $H_{ifs}$. The field $H_{ifs}$ is the field induced in the pinned layer by the current outside the pinned layer, i.e., the current flowing through the free and spacer layers. However, if the SV sensor gets heated above its blocking temperature, exchange pinning is temporarily lost and the magnetization of pinned layer 39 will align in the direction of the net field acting on it. This net field would be dominated by $H_{ifs}$, the field associated with current outside the pinned layer, as long as it exceeds $H_d$. This amount of current is a factor (f2) of approximately ½ to ⅔ of the total bias current $I_{DC}$. This results in the pinned layer 39 having an orientation of its magnetization antiparallel (rotated 180 degrees) to its original desired orientation 38. As the SV sensor cools below its blocking temperature, the new undesired magnetization orientation is retained. This results in the transfer curve 112 shown in FIG. 5C. In this transfer curve, the SV sensor is now suboptimally biased, which means that the magnetization of free layer 35 is not perpendicular to the magnetization of pinned layer 39 at zero applied field. This is due to the bias current polarity now being wrong for the direction of the new demagnetizing field. Furthermore, this transfer curve 112 has the wrong sensitivity to the applied field, as shown by curve 113 in FIG. 5D. This state will result in a high error rate due to the asymmetry between the positive and negative pulses, as shown by the readback signal waveform 113 in FIG. 5D associated with the transfer curve 112. If the waveform 113 occurs, it will result in catastrophic servo system failure because in most types of disk drives the pre-recorded servo patterns are polarity sensitive, i.e., the servo control system requires detection of a successive pair of positive and negative magnetic transitions. If the disk drive included some means for switching the direction of the bias current, then the adverse response curve 112 of FIG. 5C could be corrected by switching the bias current direction. This would recenter the curve 112 so that it would be essentially the reverse of curve 110 in FIG. 5A. In the absence of the ability to switch the bias current direction some means is required to reset the magnetization direction of the pinned layer to return the SV sensor to the desired response curve 110 of FIG. 5A.

If the SV sensor is heated above its blocking temperature while the sensor is not powered on, or only parts of the SV sensor are heated above the blocking temperature, the result can be a state where the SV sensor exhibits a reduced amplitude transfer curve 114, such as shown in FIG. 5E. This is because the component of the average magnetization of the pinned layer along the initial set direction is still positive, although there is a substantial angle between the average magnetization of the pinned layer and the initial set direction. The SV sensor with this undesired transfer curve will result in poor signal to noise ratio because a significant amount of sensor sensitivity is lost, as shown by curve 115 in FIG. 5F.

In the preferred embodiment of the present invention errors in the servo data and user data are used to detect that the signal amplitude of the SV sensor readback waveform has deviated from the desired response and signal represented by FIGS. 5A–5B. The detected errors trigger a head reset circuit that generates current pulses of a specific waveform to reset the SV sensor to a state as close to the original state as possible.

Figure 6:
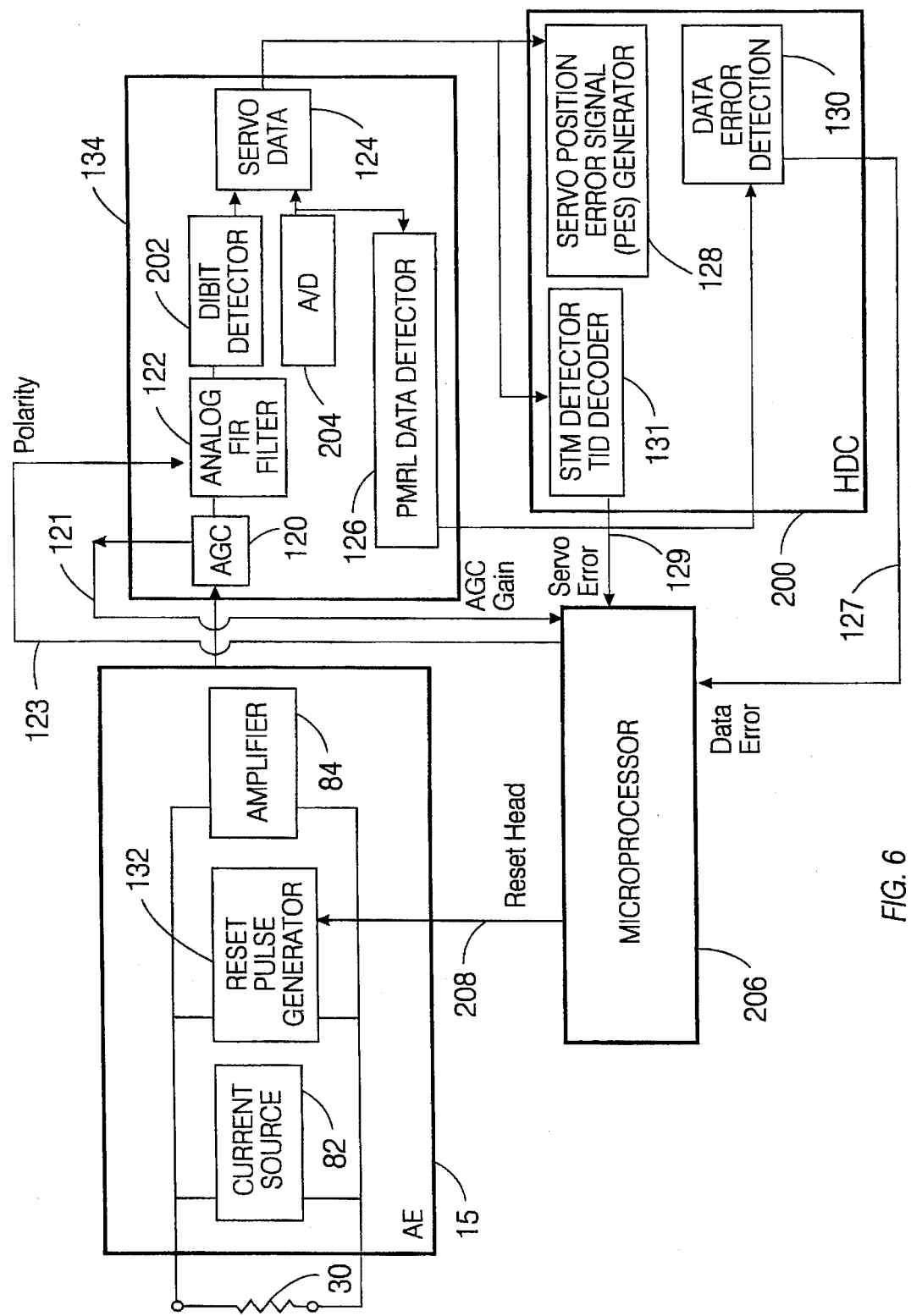
FIG. 6 is a block diagram of the basic components of the disk drive read channel electronics that process the data and servo information recorded on the disk, and the components that make up the recovery system for resetting the magnetization of the SV sensor's pinned layer.

Referring now to FIG. 6, a magnetic recording disk drive with a SV magnetoresistive read head or sensor 30 is coupled to AE module 15 and a combination data channel/servo module 134. The AE module 15 includes the conventional current source 82 that provides the bias current $I_{DC}$ to the SV sensor 30 and an amplifier 84. AE module 15 also includes a reset pulse generator 132 that forms a part of the present invention and whose operation will be explained below. In channel module 134 the recorded magnetic transitions that are sensed by the SV sensor 30 and amplified by amplifier 84 are converted to readback data for recovery of user data and servo data. The servo data provides the necessary head positioning information for the read/write transducer 25 (which includes SV read sensor 30) to remain on the designated track center. The output of AE module 15 is first put through automatic gain control (AGC) circuitry 120 where the readback waveform for a particular head is amplified to approximately the same average amplitude for all the heads at all times. The output of AGC 120 is sent through a finite impulse response (FIR) filter 122 for weighted sampling. The output from FIR 122 is fed into a dibit detector 202 that detects dibits representing servo timing marks (STM) and track identification marks (TID) that are present in the readback signal. The same FIR 122 output is also fed into an A/D converter 204 whose output is fed into a partial-response maximum-likelihood (PRML) data detector 126 for recovery of user data. The output of A/D 204 is also sent to servo data generator 124 for coding the servo burst amplitude that provides the actual head position information for the disk drive servo control system. The servo data generator 124 codes and clocks the dibits of the STM and TID as well as the servo burst amplitude and sends this to the hard disk controller (HDC) 200. The user data from PRML data detector 126 is also fed into the HDC 200.

The HDC 200 includes data error detection/correction circuitry 130 that checks the validity of the user data and its parity bits. In the event of errors, error correction is invoked. In the present invention the detection that a user data error has occurred is also used to signal microprocessor 206 with a data error signal 127.

The HDC 200 also includes a servo position error signal (PES) generator 128 that converts the output from servo data generater 124 into signals (PES) representative of the head position error. The PES is used to control the VCM actuator 14 to position the read/write transducer 25 (FIGS. 1 and 2). The HDC 200 also includes a STM/TID detector 131 to control the timing of the PES information. STM/TID detector 131 provides a servo data error output signal 129 to microprocessor 206. This signal 129 indicates the absence or invalidity of STM/TID information at the expected positions on the disk.

In most disk drives the servo patterns are pre-recorded on the disk as dibits, i.e., where a positive-going transition is immediately followed by a negative-going transition. This is done to remove the low frequency content from the servo data. The electronic dibit detector 202 is polarity sensitive, although reversal of the detection polarity is allowed. This can be accomplished by inverting FIR 122 filter taps, as represented by polarity reversal signal 123.

A failure in the SV sensor 30 that results in the sensor response and data signal represented by FIGS. 5C-5D would result in servo data errors and thus the generation of servo error signals 129. A failure in the SV sensor 30 that results in the sensor response and data signal represented by FIGS. 5E-5F would result in user data errors, and thus the generation of user data error signals 127, but without any noticeable disk drive servo performance problems because there has been no polarity reversal. In the present invention the microprocessor 206 receives as input from HDC 200 data error signals 127 and servo error signals 129 and outputs a polarity reversal signal 123 to FIR filter 122 and a reset head signal 208 to reset pulse generator 132.

Figure 7:
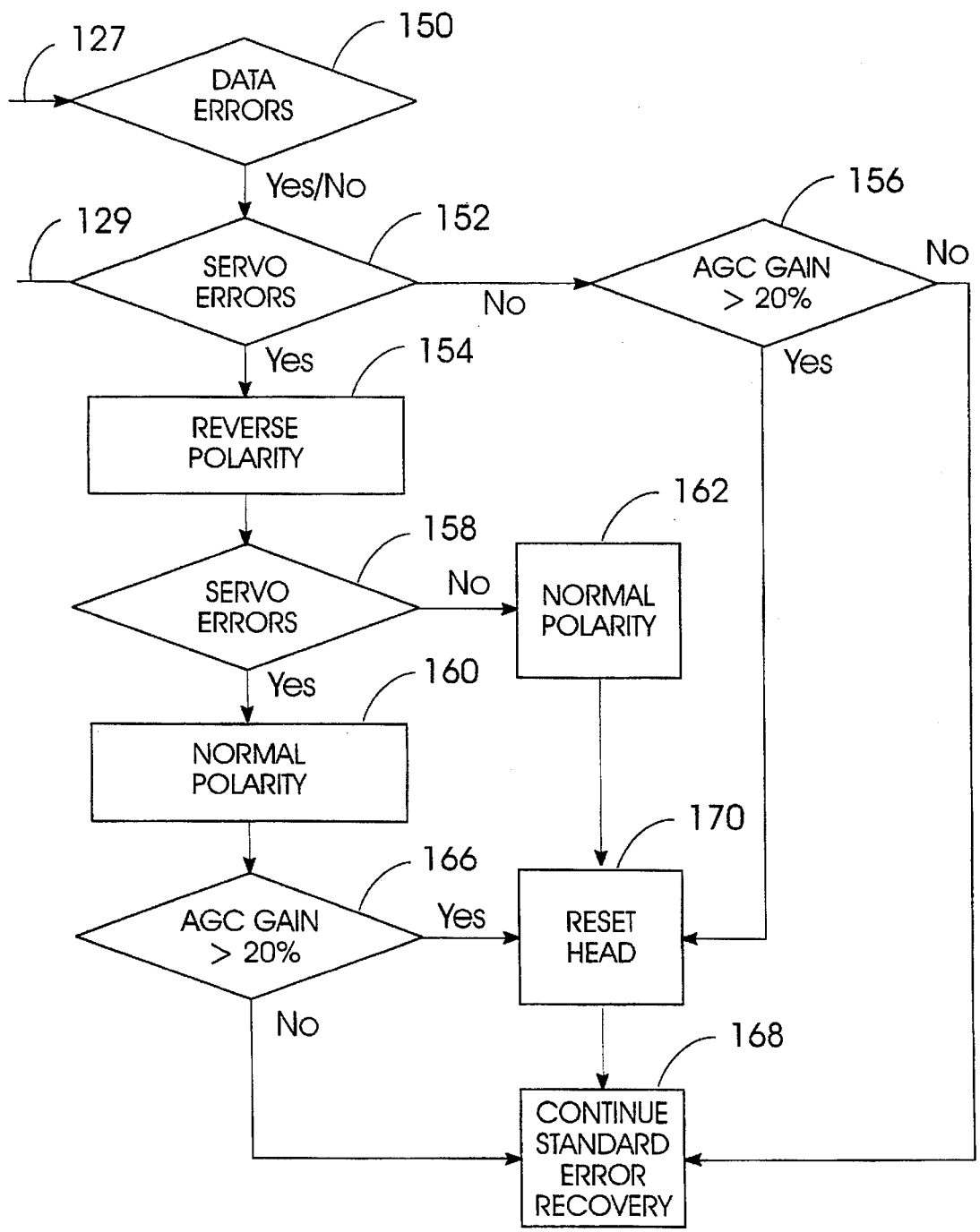
FIG. 7 is flowchart of the process for detecting that the magnetization of the SV sensor pinned layer has become misaligned during operation of the disk drive and for resetting it.

Referring now to the flowchart of FIG. 7, the procedure for resetting the SV sensor 30 will be explained. An increase in the data error rate is detected (150) by counting data error signals 127. If the count is above a predetermined threshold then microprocessor 206 checks at block (152) to determine if the increased data error rate is caused by servo errors. If a servo error signal 129 is also present (YES) then at block (154) the microprocessor 206 outputs a polarity reversal signal 123 to the analog FIR filter 122. A check is then made (158) to see if there has been a servo recovery, i.e., do servo error signals 129 continue to be received. If polarity reversal has been successful and there are no servo errors, then at block (162) the polarity is reset back to normal. Then at block (170) a reset head signal 208 is sent to reset pulse generator 132 to reset the SV sensor 30. If at block (158) polarity reversal does not result in servo error recovery so that servo error signals 129 continue to be received (YES), then the polarity is reset to normal at block (160). Then at block (166) the amplitude of the servo signal is checked and compared with its prior value. If the AGC gain is more than 20% (or some other preselected percentage) greater than its prior value (166), then at block (170) a reset head signal 208 is sent by microprocessor 206 to reset pulse generator 132. If at block (166) there is no change in servo signal amplitude, as determined by measuring the AGC increase, then it is assumed that any errors are not a result of the SV sensor losing its magnetization orientation. At this point standard error detection and recovery proceeds (168).

If at block (152) there are no servo errors detected, even though an increase in data error rate has been detected (150), the increase in AGC gain is checked (156). If (YES) the head is reset (170). Then standard error detection and error recovery proceeds (168). Alternatively, referring again to the start of the flow chart, if the microprocessor 206 receives no data error signals 127 but does receive servo error signals 129, then block (152) is entered.

The microprocessor 206 is the preferred device for providing digital processing of the data and/or servo error signals to activate the pulse generator 132. In the present invention the microprocessor 206 is the microprocessor that is already present in the disk drive to control the operation of the components making up the data channel/servo module 134. However, the function of microprocessor 206 may also be performed by a separate dedicated microprocessor or other digital processors that are present in the disk drive to control other functions.

Figure 8:
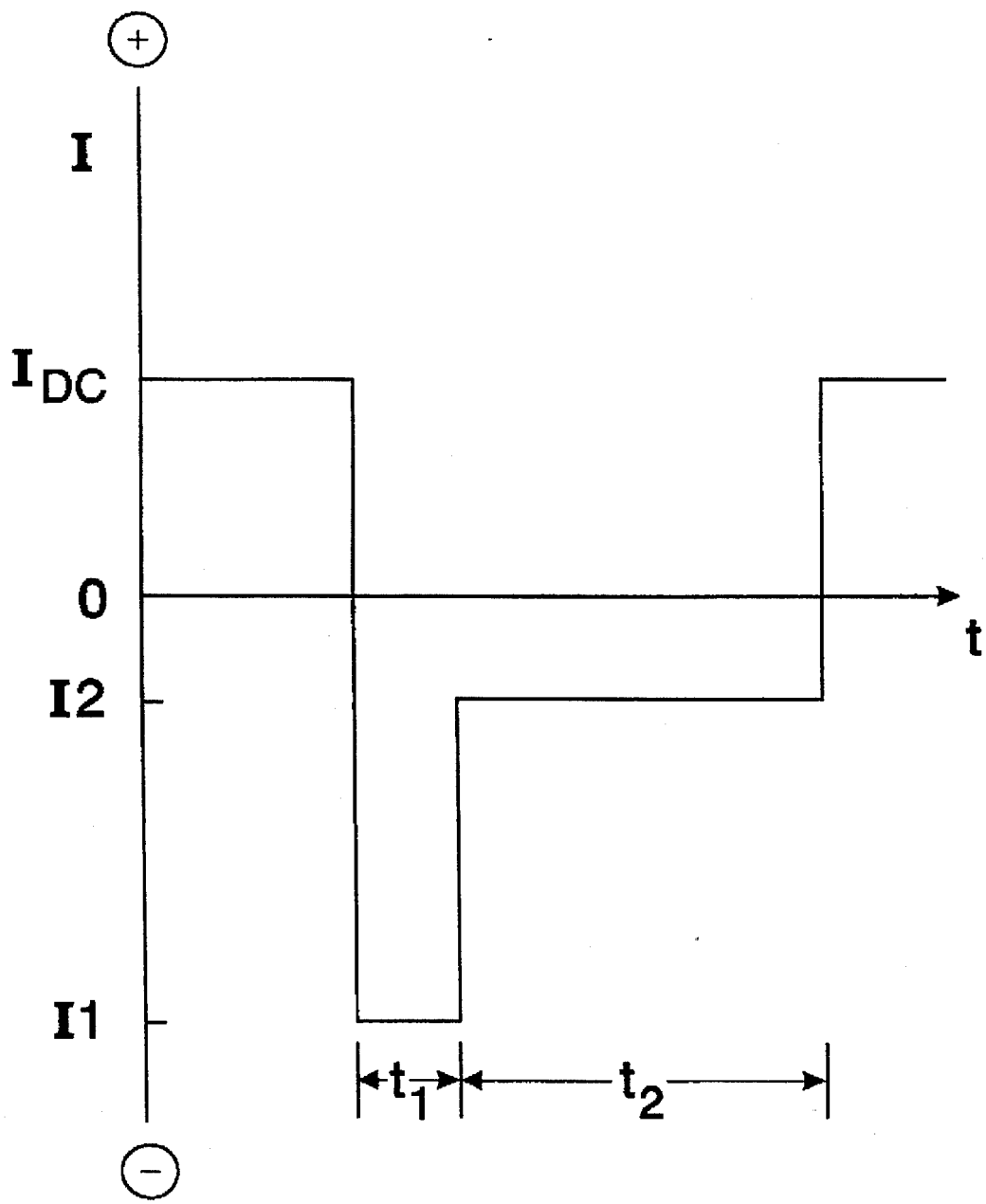
FIG. 8 is a block diagram of the current waveform used to reset the magnetization orientation of the SV sensor's pinned layer.

The SV sensor 30 is reset when reset pulse generator 132 receives a reset head signal 208 from microprocessor 206 and applies a current waveform to the SV sensor 30. Referring to FIG. 8, the reset pulse generator 132 applies a waveform that takes the current across the head to the opposite polarity of the value of its operating bias current $I_{DC}$ provided by the current source 82. The first stage of the waveform is a short duration (t1) but high amplitude pulse with a value I1. This current pulse is designed to heat the SV sensor from its ambient temperature $T_a$ to above the blocking temperature $T_b$ of the Fe-Mn antiferromagnetic material. The initial estimates for the values of I1 and t1 are thus selected to satisfy the following:

$$(t1*I1^2*R_{SV})/C_{SV} > (T_b - T_a) \quad (3)$$

where $R_{SV}$ is the resistance and $C_{SV}$ is the "effective" total heat capacity, respectively, of the SV sensor. The effective total heat capacity is the total heat capacity of the sensor that is heated by the first stage current pulse I1 and includes the heat capacity of the SV sensor as well as part of the leads and surrounding material.

The second stage of the waveform is a current value I2 that provides a sufficient magnetic field to hold the pinned layer 39 (FIG. 4) in the proper orientation for a sufficient period of time (t2) to allow the SV sensor to cool below its blocking temperature. The SV sensor is cooled by thermal conduction decay into the magnetic shields (not shown) located on the sides of the SV sensor. The duration of the second stage of the current pulse I2 should not be less than the time constant associated with this thermal decay, which is in the range of 200–1000 ns. The amplitude of the holding current I2 should be high enough to generate a magnetic field greater than the demagnetizing magnetostatic field $H_d$ of the pinned layer 39 in a shielded environment. This can be expressed as follows:

$$I2*(2\pi/s)*(f2) > H_d \quad (4)$$

However I2 should not be so high that the SV sensor does not get cooled below the blocking temperature due to the heat generated by I2. The current I2 is the primary source for the field needed to reset the pinned layer. However, the passage of current I2 through the SV sensor also causes other fields to be induced within the sensor. These include the magnetostatic coupling field from the free layer and the coupling field $H_i$. The net of these additional fields also acts to apply a slight reset field to the pinned layer. The field due to I2 should also exceed any coercivity that the pinned layer may have. The values of I1, I2 and t1 are experimentally optimized.

In one specific example for a SV sensor with a free layer thickness of 80 Angstroms, a stripe height s of 1 micron and a track width of 2 microns, $R_{SV}$ was 35 Ohms, the estimate for $C_{SV}$ was $3 \times 10^{-12}$ Joules/deg C., the value of I1 was 22 mA and t1 was 20 ns. The value of I2 was 10 mA and t2 was 300 ns. The use of this reset current waveform resulted in recovering approximately 70–95% of the original SV sensor signal amplitude that would have been obtained by aligning the pinned layer 39 in an oven in the presence of a uniform 5–15 kOe external magnetic field.

Figure 9:
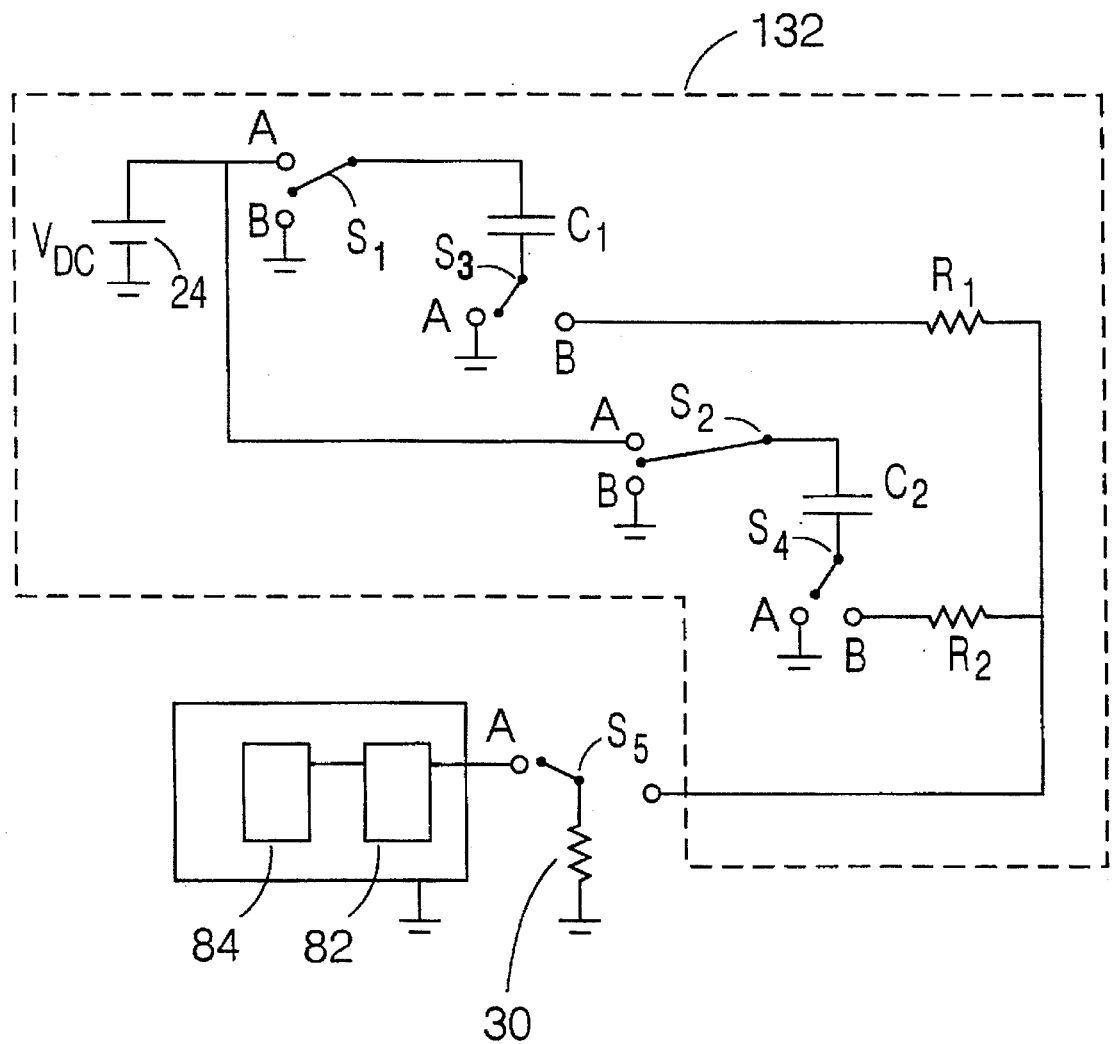
FIG. 9 is a schematic diagram of the reset pulse generator circuit for resetting the magnetization orientation of the SV sensor's pinned layer.

The reset pulse generator 132 is shown schematically in FIG. 9. In the event of an error-invoked reset head signal 208 from microprocessor 206, the SV sensor 30 is first switched out of its operating current source 82 by switch S5, from position A to position B. Capacitors C1 and C2 are charged to the power supply 240 voltage $V_{DC}$ by putting all switches S1, S2, S3, S4 into their A positions. With the capacitors C1 and C2 charged, all switches S1, S2, S3, S4 are then put into their B positions. This puts current through the SV sensor 30 in the opposite polarity as the operating bias current $I_{DC}$, similar to the waveform shown in FIG. 8. Capacitors C1 and C2 are discharged through resistors R1 and R2, respectively. Proper selection of resistances and capacitances determines the waveform of FIG. 8. The first stage current pulse I1 is given approximately by $V_{DC}/(R1+R_{SV})+V_{DC}/(R2+R_{SV})$, where $R_{SV}$ is the resistance of the SV sensor 30. The duration t1 of pulse I1 is determined approximately by R1*C1. The second stage current pulse I2 is given approximately by $V_{DC}/(R2+R_{SV})$ and t2 is determined by how long the switches 232, 234, 236, 238 remain in position B before they are returned to position A. The value of R2*C2 must therefore be larger than t2 to ensure that the holding current I2 is in place while the SV sensor is cooled below its blocking temperature. The switches shown in FIG. 9 can be implemented by the use of field effect transistors (FETs) or bipolar transistors.

The above explanation is made for the case of a single-ended AE module, i.e., where one end of the SV sensor is at ground, and the reset current flows in the opposite direction to the bias current. By electronically switching the terminals of the SV sensor the same current source that provides the bias current can also provide the reset current.

There are other versions of SV sensors where the coupling field $H_i$ is so large or the pinned layer magnetostatic field $H_d$ is so small or of opposite sign, that the bias current direction is reversed (from that described above) for proper biasing, i.e., for the free layer magnetization to be substantially perpendicular to the pinned layer magnetization at zero applied field. In this case the field induced by the current outside the pinned layer, $H_{ifs}$, aids the pinning field. If the SV sensor is heated above the blocking temperature and needs to be reset, the holding current I2 is in the same direction as the bias current $I_{DC}$. In this case the reset function can also be implemented by merely modifying current source 82 to generate a waveform similar to that of FIG. 8 under microprocessor control.

While the two stage pulse shown in FIG. 8 is preferred, a single pulse with a trailing edge decay time comparable to t2 can also be used to recover a significant fraction of the SV sensor signal amplitude. This single pulse would have an initial amplitude at least as great as I1 so that the SV sensor is heated above its blocking temperature and its amplitude during the decay would be sufficient to provide the necessary magnetic field to reset the mangetization orientation of the pinned layer.

The above described SV sensor reset techniques (with the reset current waveform in either direction relative to the bias current) can also be used with SV sensors that use other types of antiferromagnetic materials to exchange couple with the pinned layer.

While the invention has been described as incorporated in a disk drive with a PRML readback data channel and a servo control system that detects polarity sensitive PES signals, the invention is also applicable to disk drives that use other readback data detection, such as peak detection, and in disk drives that use other servo detection techniques, such as amplitude dependent PES signals. In the case of a disk drive with an amplitude dependent PES, the detection of servo errors caused by loss of magnetization orientation in the SV sensor comprises verification of the polarity of one or several reference marks on the servo or data tracks, for instance the first pulse of the AGC field. For low-amplitude caused errors in a peak detect channel, verification of the value of the AGC gain is done in a similar fashion as that for a PRML channel.

While the invention has been described in the preferred embodiment where a reset head signal is generated in response to the detection of servo errors and/or data errors (as shown by the flow chart of FIG. 7) an alternate embodiment is a method where the head is reset every time an increase in the error rate is detected. This can be done as part of the standard error detection and recovery procedure, without verification of signal amplitude loss or polarity reversal. Alternatively, the head can be reset at periodic intervals, such as at disk drive power on. This could be done without any detection of data errors or other verification of signal amplitude loss or polarity reversal.

The reset technique according to the present invention can also be used as part of the manufacturing process to reset heads prior to final disk drive assembly or test to overcome manufacturing line mild electrostatic discharge events. Also, a modified technique can be used in assembly or test, wherein the current from the reset pulse generator is used to heat the SV sensor above the blocking temperature while an external magnet is used to generate the required reset field.

External Magnetic Field Sensors

Figure 10:
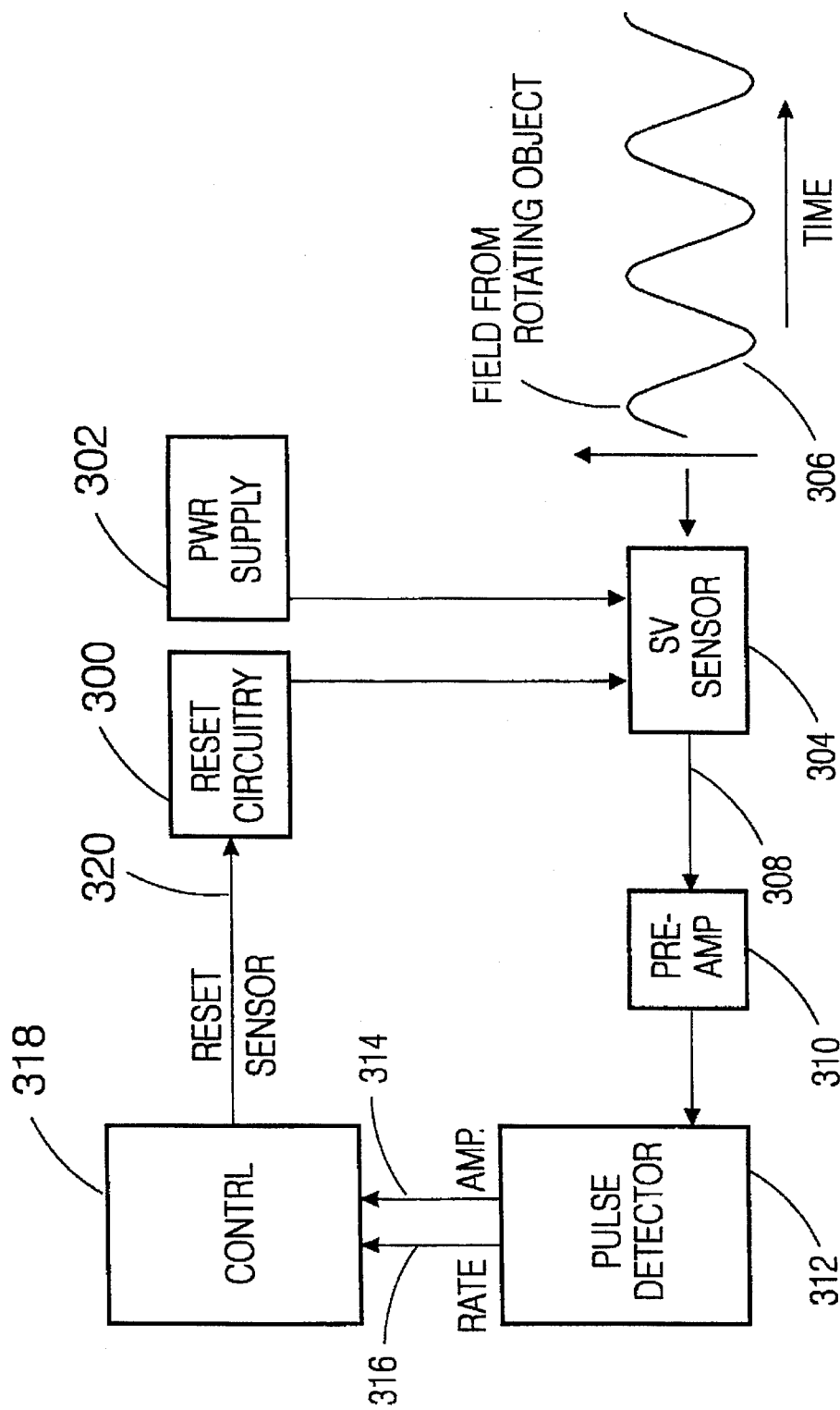
FIG. 10 is a block diagram of a system for resetting the magnetization of the pinned layer in a SV field sensor that detects an external magnetic field.

The system for resetting the magnetization of the pinned layer in a SV MR read head used in magnetic recording applications can also be applied to any SV sensor that has a pinned layer with its magnetization direction pinned by an antiferromagnetic layer, such as SV sensors used to sense external magnetic fields. IBM's copending application Ser. No. 08/334,659, filed Nov. 4, 1994, now U.S. Pat. No. 5,561,368, describes a bridge circuit field sensor based on multiple SV elements. These types of SV sensors also may experience thermal events that will result in the misorientation of the magnetization of the pinned layer. A block diagram of a SV field sensor system and the system according to the present invention for resetting the pinned layer in such a SV field sensor is shown in FIG. 10. During normal operation of the SV field sensor 304, the bias current is provided to sensor 304 by a power supply 302. Sensor 304 converts an oscillating external magnetic field 306 to a voltage output 308. The oscillating external magnetic field intercepted by the field sensor 304 is typically caused by a rotating object. For example, in automobile anti-lock braking systems a magnet may be located on the rotating disk of the disk brake or the magnet may be fixed and ferromagnetic material located on the rotating disk. In either case a repetitive oscillating field of essentially a fixed amplitude is presented to the sensor as the disk rotates. The rate of oscillation of the field is detected as the rate of rotation of the disk. This voltage output 308 is amplified by a preamplifier 310 to be detected by a pulse detector 312. The pulse detector 312 supplies a digital processor or controller 318 with the detected oscillation rate 316 and amplitude 314 of the external magnetic field being sensed. The controller 318 compares the detected amplitude with a threshold, which may be a previously recorded amplitude. Alternatively the controller compares the rate with the expected rate. The expected rate is a threshold pre-selected from the known state of the apparatus the sensor is located in. If the detected rate and/or amplitude is then lower than the predetermined thresholds the controller 318 sends a reset sensor signal 320 to reset pulse generater 300. The reset pulse generator 300 provides a reset current waveform similar to that shown in FIG. 8 to sensor 304.

While the present invention has been particularly shown and described with reference to the preferred embodiments, it will be understood by those skilled in the art that various changes in form and detail may be made without departing from the spirit and scope of the invention. Accordingly, the disclosed invention is to be considered merely as illustrative and limited in scope only as specified in the appended claims.

What is claimed is:

1. A magnetic field sensing system comprising:
   a magnetoresistive sensor for sensing magnetic fields, the sensor including a ferromagnetic layer and an antiferromagnetic layer adjacent to and in contact with the ferromagnetic layer for pinning the magnetization of the ferromagnetic layer in a preferred direction;
   signal detection circuitry coupled to the sensor for detecting changes in electrical resistance of the sensor in response to magnetic fields sensed by the sensor; and
   electrical current pulse generating circuitry coupled to the sensor for applying electrical current to the sensor to reset the magnetization direction of the ferromagnetic layer if the magnetization of the ferromagnetic layer becomes misaligned from its preferred direction.

2. A system as in claim 1 wherein the pulse generating circuitry includes circuitry for generating a first current pulse having a first amplitude to heat the sensor and a second current pulse having a second amplitude less than the first amplitude to generate a reset magnetic field around the sensor after the sensor has been heated by the first current pulse.

3. A system as in claim 1 wherein the pulse generating circuitry includes circuitry for generating a current pulse having an initial amplitude to heat the sensor and a subsequent lesser amplitude to generate a reset magnetic field around the sensor after the sensor has been heated by the initial current from the pulse.

4. A system as in claim 1 wherein the magnetic field to be sensed is an external magnetic field having a generally fixed amplitude that repetitively passes the sensor at a specific rate, wherein the magnetoresistive sensor is an external magnetic field sensor, wherein the signal detection circuitry includes a pulse detector for determining the amplitude or rate of the external magnetic field, and wherein the pulse generating circuitry is responsive to the detected amplitude or rate.

5. A system as in claim 4 further comprising a digital processor coupled between the pulse detector and the pulse generating circuitry for generating a reset sensor signal to the pulse generating circuitry when the detected amplitude or rate exceeds a predetermined threshold.

6. A system as in claim 1 wherein the magnetic fields to be sensed are recorded on magnetic recording media, wherein the magnetoresistive sensor is a magnetic recording read head and wherein the signal detection circuitry includes a readback channel for converting the detected changes in electrical resistance of the sensor into digital data, and further comprising an error detector for detecting errors in the digital data, and wherein the pulse generating circuitry is responsive to detected data errors.

7. A system as in claim 6 further comprising a digital processor coupled between the error detector and the pulse generating circuitry for receiving error detection signals from the error detector and signaling the pulse generating circuitry.

8. A system as in claim 1 wherein the electrical current pulse generating circuitry includes a current source that also provides a bias current to the sensor.

9. A magnetic recording disk drive comprising:
a magnetic recording disk;
a motor connected to the disk for rotating the disk;
a magnetoresistive sensor for sensing magnetically recorded data on the disk, the sensor including a ferromagnetic layer and an antiferromagnetic layer adjacent to and in contact with the ferromagnetic layer for pinning the magnetization of the ferromagnetic layer in a preferred direction; a carrier for supporting the sensor;
an actuator for moving the carrier generally radially across the disk so the sensor may access different regions of magnetically recorded data on the disk;
signal detection circuitry coupled to the sensor for detecting changes in electrical resistance of the sensor in response to magnetic fields sensed by the sensor from the magnetically recorded data on the disk;
electrical current pulse generating circuitry coupled to the sensor for applying electrical current to the sensor to reset the magnetization direction of the ferromagnetic layer if the magnetization of the ferromagnetic layer becomes misaligned from its preferred direction; and
means for supporting the motor and actuator.

10. A disk drive as in claim 9 wherein the pulse generating circuitry includes circuitry for generating a first current pulse having a first amplitude to heat the sensor and a second current pulse having a second amplitude less than the first amplitude to generate a reset magnetic field around the sensor after the sensor has been heated by the first current pulse.

11. A disk drive as in claim 9 wherein the pulse generating circuitry includes circuitry for generating a current pulse having an initial amplitude to heat the sensor and a subsequent lesser amplitude to generate a reset magnetic field around the sensor after the sensor has been heated by the initial current from the pulse.

12. A disk drive as in claim 9 wherein the signal detection circuitry includes a readback channel for converting the detected changes in electrical resistance of the sensor into digital data, and further comprising an error detector for detecting errors in the digital data, and wherein the pulse generating circuitry is responsive to detected data errors.

13. A disk drive as in claim 12 further comprising a digital processor coupled between the error detector and the pulse generating circuitry for receiving error detection signals from the error detector and signaling the pulse generating circuitry.

14. A disk drive as claim 12 wherein the disk drive includes a servo control system for controlling the position of the actuator in response to servo positioning data prerecorded on the disk, and further comprising a servo error detector for detecting errors in the servo data, and wherein the pulse generating circuitry is responsive to detected servo errors.

15. A disk drive as in claim 9 wherein the electrical current pulse generating circuitry includes a current source that also provides a bias current to the sensor.

16. A magnetic recording disk drive comprising:
a magnetic recording disk;
a motor connected to the disk for rotating the disk;
a spin valve magnetoresistive sensor for sensing magnetically recorded data on the disk, the sensor comprising (a) a free ferromagnetic layer having a magnetization orientation in the absence of an applied magnetic field that is substantially perpendicular to the direction of the magnetic filed to be detected; (b) a metallic nonmagnetic spacer layer adjacent to and in contact with the free ferromagnetic layer; (c) a pinned ferromagnetic layer adjacent to and in contact with the spacer layer and having a preferred magnetization oriented generally perpendicular to the magnetization of the free ferromagnetic layer in the absence of an applied magnetic field; and (d) an antiferromagnetic material formed as a layer adjacent to and in contact with the pinned ferromagnetic layer for pinning the magnetization of the pinned ferromagnetic layer, the antiferromagnetic material having an inherent blocking temperature above which exchange pinning between the antiferromagnetic layer and the adjacent pinned layer is substantially lost;
a carrier for supporting the sensor;
an actuator for moving the carrier generally radially across the disk so the sensor may access different regions of magnetically recorded data on the disk;
signal detection circuitry coupled to the sensor for detecting changes in electrical resistance of the sensor in response to magnetic fields sensed by the sensor from the magnetically recorded data on the disk, the signal detection circuitry including a readback channel for converting the detected changes in electrical resistance of the sensor into digital data and an error detector for detecting errors in the digital data;
a digital processor coupled to the error detector, the digital processor providing an output signal in response to signals from the error detector indicative of errors in the digital data; and
electrical current pulse generating circuitry responsive to the digital processor output signal for applying an electrical current waveform to the sensor, the current waveform providing initial current sufficient to heat the antiferromagnetic layer above its blocking temperature and subsequent current sufficient to generate a reset magnetic field around the pinned layer while the antiferromagnetic layer is cooling, whereby the magnetization direction of the pinned layer is reset to its preferred orientation.

17. A disk drive as in claim 16 wherein the disk drive includes a servo control system for controlling the position of the actuator in response to servo positioning data prerecorded on the disk, and further comprising a servo error detector for detecting errors in the servo data, and wherein the digital processor is coupled to the servo error detector and responsive to detected servo errors.

18. A disk drive as in claim 16 wherein the electrical current pulse generating circuitry includes a current source that also provides a bias current to the sensor.

* * * * *